United States Patent [19]
Glass

[11] Patent Number: 5,490,701
[45] Date of Patent: Feb. 13, 1996

[54] PINE CONE RETRIEVER

[75] Inventor: Roger M. Glass, Hilton Head Island, S.C.

[73] Assignee: Cone Swallow Inc., Hilton Head Island, S.C.

[21] Appl. No.: 500,180

[22] Filed: Jul. 10, 1995

[51] Int. Cl.$^6$ .............................. A01B 1/00; A01D 11/00
[52] U.S. Cl. ............................................ 294/61; 294/19.1
[58] Field of Search .................................. 294/19.1–19.3, 294/50.5, 50.6, 61, 99.1, 126; 43/6; 56/327.1, 328.1, 332; 172/371, 378

[56] References Cited

U.S. PATENT DOCUMENTS

| | | | |
|---|---|---|---|
| D. 211,637 | 7/1968 | McKusick | 43/6 X |
| 796,413 | 8/1905 | Butler | 294/61 X |
| 2,552,467 | 5/1951 | Thomas | 294/61 |
| 3,602,542 | 8/1971 | Disston | 294/61 X |
| 3,658,371 | 4/1972 | Dowdey | 294/61 |
| 3,712,660 | 1/1973 | Moore | 294/61 |
| 4,718,189 | 1/1988 | Stude | 294/61 X |

Primary Examiner—Johnny D. Cherry
Attorney, Agent, or Firm—Willard M. Hanger

[57] ABSTRACT

A pine cone retrieving tool having an array of three flexible, elongated tines extending downwardly from a flat support plate on the lower end of an elongated handle with the tines arranged in a downwardly converging array in which the separations between adjacent sides of the lower ends of each of the respective pairs of adjacent tines are unequal distances correlative to straddling dimensions of pine cone varieties.

6 Claims, 2 Drawing Sheets

U.S. Patent    Feb. 13, 1996    Sheet 1 of 2    5,490,701
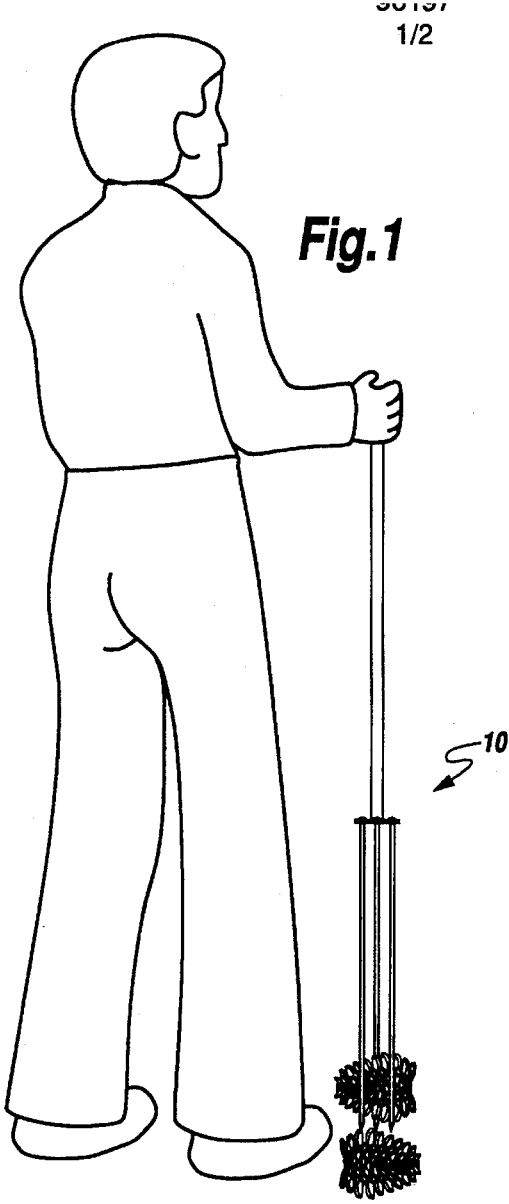
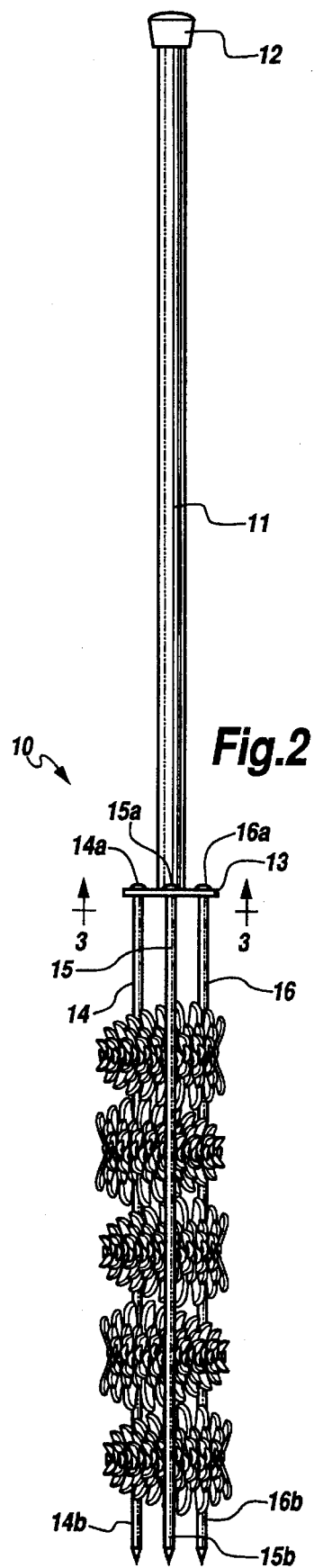
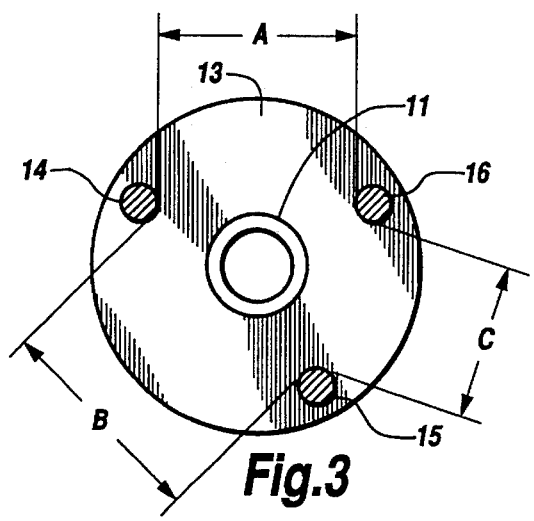

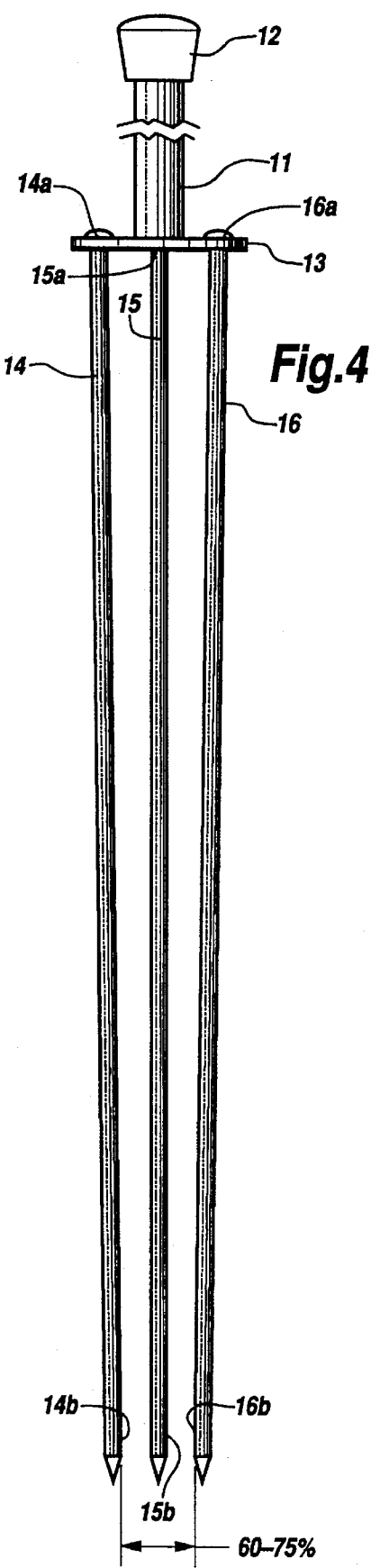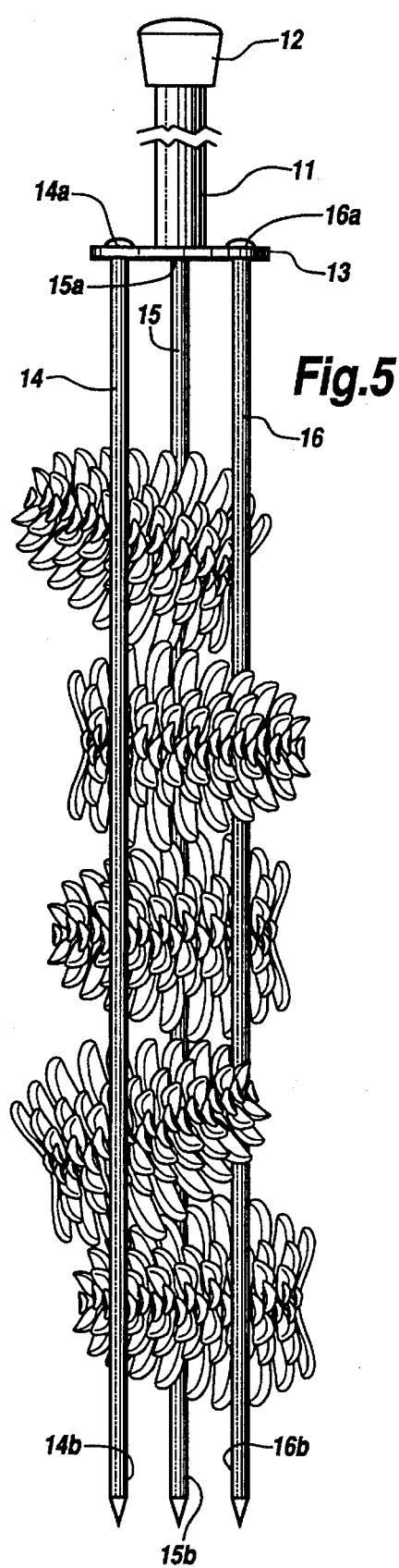

5,490,701

1

PINE CONE RETRIEVER

BACKGROUND OF THE INVENTION

My invention relates to a device for gathering pine cones without stooping and picking up each cone by hand.

Pine cones of various sizes, particularly those having a high degree of bract expansion, are in great demand for decorative purposes. Retrieving such cones from the ground by bending or stooping is very onerous and substantially impossible by persons with infirmities.

Pick up tools for retrieving objects from the ground by persons standing upright have been produced in various forms in which jaws or blades hingeably mounted at the lower end of an elongated handle are operable between open and closed positions for gripping the article to be retrieved. Typical of such devices are those disclosed in U.S. Pat. Nos. 3,157,422; 3,333,881; 3,601,966; 4,143,899 and 4,615,555. Whereas such devices are highly suitable for picking up single or closely grouped articles or bunches of articles, they are not well adapted for quickly retrieving large numbers of scattered individual objects such as pine cones. Furthermore, rotatably mounted, hinged, jaw member type retrievers are generally heavy, complex to operate and relatively expensive.

Very simple retrieving devices comprising one or more prongs with pointed ends and mounted to extend below an elongated handle of which some incorporate movable means for stripping objects pierced by the pointed prongs are commonly used for picking up trash, leaves, paper and the like from the ground. Typical of the stripping type piercing devices incorporating stripping features are those disclosed in U.S. Pat. Nos. 2,520,764; 2,552,467 and 2,804,336. Unsophisticated piercing type retrieving devices are also well known comprising elongated pointed end prongs extending below an elongated handle. Retrieving devices which involve piercing the object to be retrieved are not suitable for retrieving pine cones inasmuch as pine cones for decorative purposes are normally considerably damaged if the retrieved pine cone has been pierced by prongs.

SUMMARY OF THE INVENTION

The object of the invention is to produce a simple, inexpensive device which will enable a person in an upstanding position to rapidly retrieve various sizes and categories of pine cones scattered over the ground without damage to the cones.

A further object of the invention is to produce a simple device having no moving parts that lightly grips various categories and sizes of cones in a manner as not to damage the cones.

These objects have been achieved by a retrieving tool having an elongated handle at the lower end of which a plurality of three elongated, flexible tines with lower pointed ends are mounted at the lower end of a handle to extend downwardly as a converging array of unequally spaced apart, flexible tines in which the spacing between the adjacent side surfaces of the lower ends of respective pairs of the tines conforms to the distance required for the tines to straddle and lightly contain varying size pine cones between adjacent tines.

BRIEF DESCRIPTION OF THE DRAWINGS

FIG. 1 is an illustration of a person operating the tool of my invention in the act of retrieving pine cones.

2

FIG. 2 is a side elevation of the retrieving tool of FIG. 1 loaded with pine cones along its length.

FIG. 3 is a plan view from below of the retrieving tool of FIG. 2 along section line 3—3.

FIG. 4 is a partial side elevation of the retrieving tool.

FIG. 5 is a partial side elevation of the retrieving tool of FIG. 4 substantially filled with retrieved pine cones.

DETAILED DESCRIPTION OF THE INVENTION

First referring to FIGS. 2, 4 and 5, the retrieving tool 10 has an elongated tubular handle 11 of convenient length with a protective cap 12 press-fitted onto the top end of the handle with a flat tine supporting plate 13 affixed to the lower end of the handle 11, by welding or other suitable manner, to extend transversely of the handle. Three elongated tines 14, 15, 16 are affixed to the support plate 13 to extend downwardly as a converging array of unequally spaced apart tines in which respective upper ends 14a, 15a, 16a are affixed to the support plate 13 at locations which are preferably radially symmetrical of the handle and unequally spaced apart circumferentially of the support plate 13 with the tines 14, 15, 16 being arranged to extend downwardly from the support plate 13 as an array in which the unequally spaced apart tines converge in the direction of their sharpened lower ends 14b, 15b, 16b. As best seen in FIG. 3, the spacing B between adjacent upper side surfaces of the first pair of tines 14, 15 in the array is greater than the spacing A between the adjacent upper side surfaces of the second pair of tines 14, 16 in the array and the spacing C between adjacent upper side surfaces of the third pair of tines 15, 16 in the array is less than the spacings A or B. The lengthwise alignment of the tines is such that they converge along their length to the degree that the spacings between adjacent side surfaces at the lower ends of the respective pairs of tines in the array are proportionally less than the upper end spacings by approximately the same amount, these differences being in the range of approximately 60%–75% as indicated in FIG. 4. The tines must have a moderate degree of flexibility as will permit the tines to flex along their length when objects become lodged between adjacent tines as illustrated in the converging array of tines of the empty tool of FIG. 4 and the more parallel position of the tine array illustrated in FIG. 5 in which the sides of adjacent tines exert an inwardly directed biasing force on the cones straddled between the side surfaces of the adjacent pairs of tines. In general, a length-to-diameter ratio of the tines of at least 60 to 1 provides the required degree of flexibility. In a preferred embodiment of the invention, the tines comprise ¼ inch cold rolled low carbon steel rod 18 inches in length.

The indicated arrangement of an operatively successful tool having a plurality of three elongated tines arranged to extend downwardly in a converging array with the disclosed amount of unequal spacings between adjacent side surfaces of respective pairs of tines, each having a moderate degree of flexibility, was derived from extensive numbers of experiments utilizing various numbers of tines with various equal and unequal spacings. It was found that pine cones of various sizes could be retrieved without significant damage if the number of tines in the array was three and the tines were arranged with separations such that the lower end regions of the inner surfaces of adjacent tines straddled cones in a manner as applied a small degree of inwardly directed biasing force on the cones as successive cones contained between the tines were forced upwardly between the tine array by pressing the pointed ends of the tines into the ground in the manner illustrated in FIG. 1, successive cones being forced upwardly between the tines as seen in FIG. 2. As best seen in FIG. 5, the unequally spaced apart tines lie between the bracts of retrieved expanded pine cones and apply a light retaining pressure against the central portion of the cones lying between the expanded bracts. Although not illustrated, tines arranged in accordance with my invention will also straddle compact cones having a lesser diameter before the bracts have expanded. In the experiments, it was found that the number of tines required for a satisfactory operative retrieving tool should be three and, to retrieve compact as well as bract-expanded cones, the spacing between the respective pairs of the three tines should be unequal. It was also found that the lower end portions of respective tines of the array would likely straddle pine cones of substantially all sizes and configurations in a manner as would allow pine cones to be successively pushed upwardly along the length of the array as illustrated in FIG. 5 if the tines were steel rod 18 inches long, ± about 3 inches, with a tine length-to-diameter ratio of at least 60 and upper ends of the respective tines were affixed to the support plate at locations circumferentially of the support plate with a separation between adjacent surfaces of the three respective pairs of tines corresponding to dimensions B, A and C of FIG. 3 being respectively 1¾, 1⅝ and 1¼ inches, ± about 10%, and the tines arranged to converge in reducing the separation between the corresponding tine lower segment regions by 60%–75%. Whereas the tines of the preferred embodiment of the tool comprised ¼ inch diameter, 18 inch long cold rolled low carbon steel rod, it is contemplated that material of equivalent flexing characteristics would be suitable for the tines.

It should be understood that the foregoing disclosure relates to one preferred embodiment of my invention and that numerous modifications or alterations may be made therein without departing from the scope of my invention as set forth in the appendant claims.

What is claimed is:

1. A tool for retrieving pine cones comprising:

an elongated handle, a support plate extending transversely of a lower end of said handle, a plurality of three elongated, flexible tines having upper ends affixed to said support plate at unequally spaced apart, triangularly oriented locations and arranged to extend downwardly from said support plate with individual tines converging along their length such that the separations between adjacent sides at the lower ends of each of the respective pairs of adjacent tines comprising the three-tine array are unequal distances correlative to straddling dimensions of pine cone varieties.

2. The tool of claim 1 wherein the length-to-diameter of said tines is at least 60 to 1.

3. The tool of claim 2 wherein the length of each said tine is at least 15 inches.

4. The tool of claim 3 wherein the said tine upper end affixing locations on said support plate are such that the maximum spacing between adjacent sides of any of said pairs of adjacent tines does not exceed 2 inches and the minimum spacing between adjacent tines of any of said pairs of adjacent tines is not less than 1 inch.

5. The tool of claim 4 wherein said tines are cold rolled low carbon steel rod less than 5/16 inches in diameter.

6. The tool of claim 1 wherein said tines comprise low carbon steel cold rolled rod approximately 18 inches long and ¼ inch in diameter, said tine upper end support plate affixing locations are such that the spacing between adjacent surfaces of a first and a second one of said three tines is approximately 1¾ inches, the spacing between adjacent surfaces of said first and a third one of said three tines is approximately 1⅝ inches and the spacing between adjacent surfaces of the second and third tines is approximately 1¼ inches and said tines are convergingly aligned such that the spacing between adjacent surfaces of adjacent ones of said pairs of tines is substantially less at the lower ends of said tines than at the upper ends of said tines.

\* \* \* \* \*